US012764044B2

(12) United States Patent
Devarajan

(10) Patent No.: US 12,764,044 B2
(45) Date of Patent: Oct. 13, 2026

(54) AVOIDING DUPLICATE IP FLOW INFORMATION EXPORT RECORD REPORTS IN A NETWORK FABRIC

(71) Applicant: HEWLETT PACKARD ENTERPRISE DEVELOPMENT LP, Spring, TX (US)

(72) Inventor: Venkatavaradhan Devarajan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 30 days.

(21) Appl. No.: 19/171,458

(22) Filed: Apr. 7, 2025

(65) Prior Publication Data

US 2026/0214032 A1 Jul. 23, 2026

(30) Foreign Application Priority Data

Jan. 23, 2025 (IN) ............................ 202541005572

(51) Int. Cl.

| | |
|---|---|
| ***H04L 43/028*** | (2022.01) |
| ***H04L 12/46*** | (2006.01) |
| ***H04L 43/062*** | (2022.01) |

(52) U.S. Cl.

CPC ........ *H04L 43/028* (2013.01); *H04L 12/4633* (2013.01); *H04L 43/062* (2013.01)

(58) Field of Classification Search

CPC .... H04L 47/125; H04L 47/50; H04L 63/0236

See application file for complete search history.

(56) References Cited

U.S. PATENT DOCUMENTS

| | | | | |
|---|---|---|---|---|
| 11,799,779 | B1 * | 10/2023 | Yungelson | H04L 45/38 |
| 2015/0341314 | A1 * | 11/2015 | Roberson | H04L 63/02 726/1 |
| 2018/0205624 | A1 * | 7/2018 | Rai | H04L 43/0852 |
| 2020/0366578 | A1 * | 11/2020 | Punj | H04L 43/028 |
| 2022/0014451 | A1 * | 1/2022 | Naik | H04L 41/22 |

(Continued)

OTHER PUBLICATIONS

Boschi, Elisa, and Brian Trammell. "Bidirectional flow measurement, ipfix, and security analysis." (2006). (Year: 2006).*

(Continued)

*Primary Examiner* — Chirag R Patel

(74) *Attorney, Agent, or Firm* — Yao Legal Services, Inc.

(57) ABSTRACT

A system receives, by an access switch in a network fabric, a first flow indicating a destination internal to the network fabric. The system records the first flow and a first reverse flow in a flow table. The system marks the access switch as an owner for the first flow and for the first reverse flow, and a respective owner provides information associated with a respective flow based on Internet Protocol Flow Information Export (IPFIX). The system exports information associated with the flows. The system receives a second flow, whose source has previously been marked as an owner for the second flow and for a second reverse flow. The system records the second flow and reverse flow in the flow table, refrains from marking the access switch as the owner for the second flow and reverse flow, and refrains from exporting information associated with the second flow and reverse flow.

20 Claims, 10 Drawing Sheets

(56) References Cited

U.S. PATENT DOCUMENTS

2025/0039140 A1 * 1/2025 Rolando ............ G06F 9/45558

OTHER PUBLICATIONS

Trammell, Brian and Elisa Boschi. Bidirectional Flow Export Using IP Flow Information Export (IPFIX). IETF, Jan. 2008. Request for Comments 5103. RFC Editor Repository (Year: 2008).*

R. Hofstede et al., "Flow Monitoring Explained: From Packet Capture to Data Analysis With NetFlow and IPFIX, " in IEEE Communications Surveys & Tutorials, vol. 16, No. 4, pp. 2037-2064, Fourthquarter 2014, doi: 10.1109/COMST.2014.2321898. (Year: 2014).*

* cited by examiner

AVOIDING DUPLICATE IP FLOW INFORMATION EXPORT RECORD REPORTS IN A NETWORK FABRIC

BACKGROUND

Network devices, such as access switches in a network fabric, can track flows based on Internet Protocol Flow Information Export (IPFIX), which is based on a 5-tuple of [src.id, src.port, dest.id, dest.port, and ip.protocol]. A network device can record and report this IPFIX flow information to a "collector" entity for subsequent analysis of network traffic usage. In the case of traffic flows between an access switch and an entity external to the network fabric ("North-South" traffic), only the access switch may be reporting IPFIX information to the collector. However, in the case of traffic flows between access switches in a same network fabric ("East-West" traffic), both access switches may be reporting the same IPFIX flow information. Reporting this duplicate information may consume bandwidth and result in unnecessary load on the collector.

BRIEF DESCRIPTION OF THE FIGURES

In the figures, like reference numerals refer to the same figure elements.

DETAILED DESCRIPTION

Figure 1A:
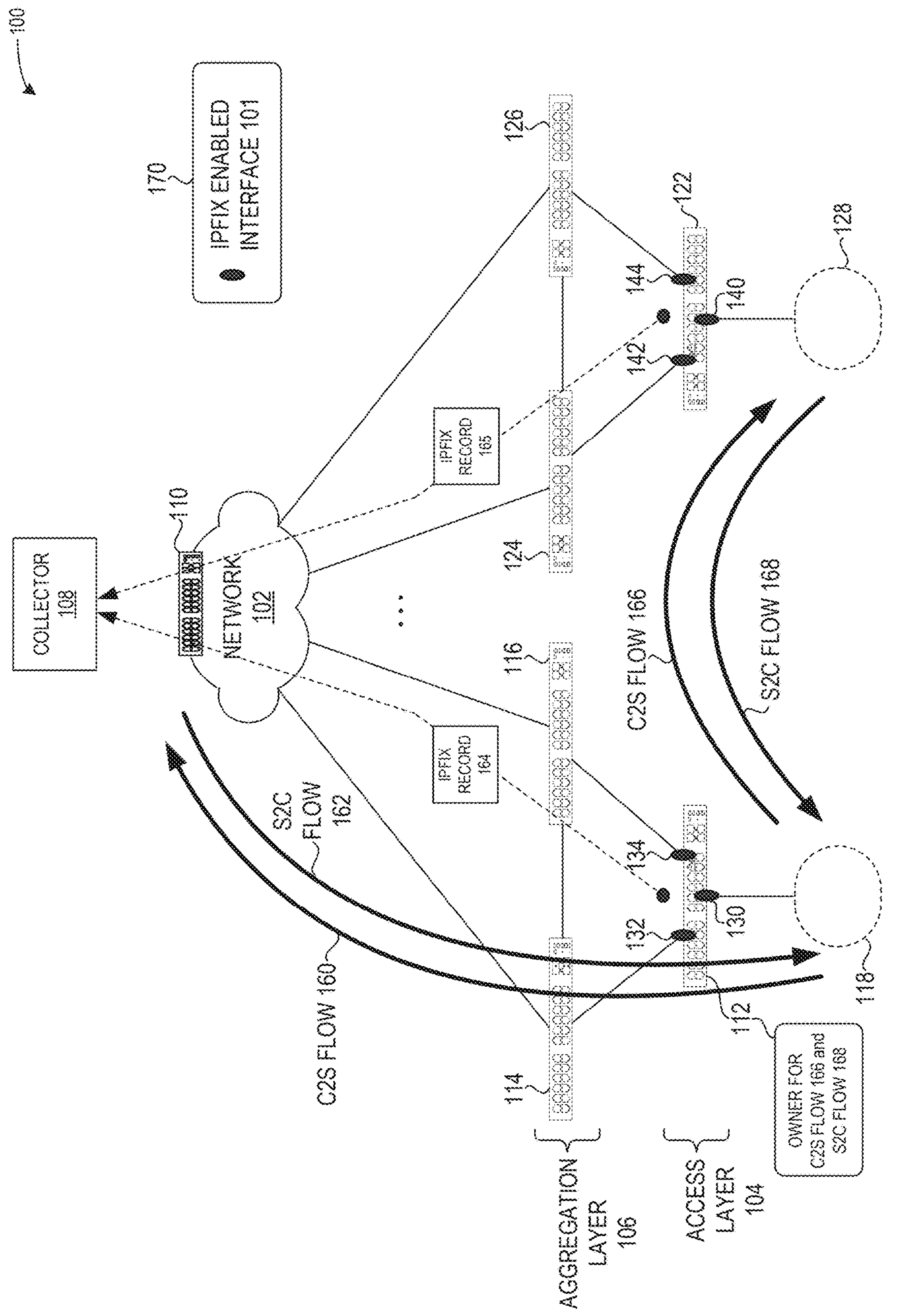
FIG. 1A illustrates an environment which facilitates avoiding duplicate IPFIX flow records, in accordance with an aspect of the present application.

Aspects of the present application provide a system which eliminates duplicate IPFIX records, both in an overlay network (such as Ethernet Virtual Private Network (EVPN) and VxLAN-based networks) and in a non-overlay network.

Network devices, such as access switches in a network fabric, can track flows based on Internet Protocol Flow Information Export (IPFIX), which is based on a 5-tuple of [src.id, src.port, dest.id, dest.port, and ip.protocol]. A network device may record the 5-tuple as a flow or connection passes through the network device. A network device which is configured to communicate with an IPFIX "collector" entity can export the 5-tuple information with associated statistics and other flow-specific attributes to the collector or a network monitoring application.

Examples of a network monitoring application can include, e.g., Solarwinds, Datadog, OpsRamp, IMC. A network monitoring application may use the information for subsequent analysis of network traffic usage, which can provide visibility into, e.g., the type of traffic within the network, which clients have the most active flows, which destinations are more frequently accessed than others, whether a file download or traffic streaming is occurring, etc. The analysis of the network traffic usage may be further used to analyze network bandwidth requirements, search for bad actors to be quarantined from the network, create an optimal set of network access policies, etc.

In general, a network device may learn about a new flow and track statistics associated with that flow by recording and accessing data in a "datapath flow table." The datapath may be associated with a hardware-based path (e.g., an application specific integrated circuit (ASIC)) or a software (SW-) based "fast path." The datapath flow table may include the 5-tuple of information, including the source IP address, the source port, the destination IP address, the destination port, and the IP protocol. When the new flow is learned, the network device may associate a counter resource with the flow and record statistics about the flow in the flow table. The counter resource may track a number of bytes or packets of the flow which are processed by or travel through the network device.

Upon receiving the new flow, the network device may perform a lookup in the datapath flow table, which may result in a "miss" notification. Many network devices may use software (SW) ("slow path") to assist in programming the datapath flow table based on the miss notification generated by the datapath, as described below in relation to FIG. 1B.

In the networks described herein, "downstream" clients may communicate with each other via corresponding access switches, which in turn may communicate with their "upstream" network devices (e.g., border switches, WAN routers, etc.). IPFIX may typically be enabled on both client-facing ports (referred to as "downlink ports") and server or network-facing ports (referred to as "uplink ports") of an "endpoint attached switch" (e.g., a network access switch). The access switch may track all connections that are ingressing on both its downlink and uplink ports.

FIG. 1A illustrates an environment 100 which facilitates avoiding duplicate IPFIX flow records, in accordance with an aspect of the present application. Environment 100 can depict a network fabric with network devices, including: an access layer 104 which includes access switches 112 and 122; an aggregation layer 106 which includes switches 114, 116, 124, and 126; a wide area network (WAN) router 110 associated with an upstream network 102; and a collector 108. Access switch 112 may communicate with aggregation layer switches 114 and 116, which may communicate with WAN router 130 for communication outside of the network fabric. Switches 114 and 116 may also communicate, via upstream network 102, with aggregation layer switches 124 and 126, which in turn may communicate with access switch 122. A downstream client 118 may communicate with other clients via access switch 112, and a downstream client 128 may similarly communicate with other clients via access switch 122.

Figure 1B:
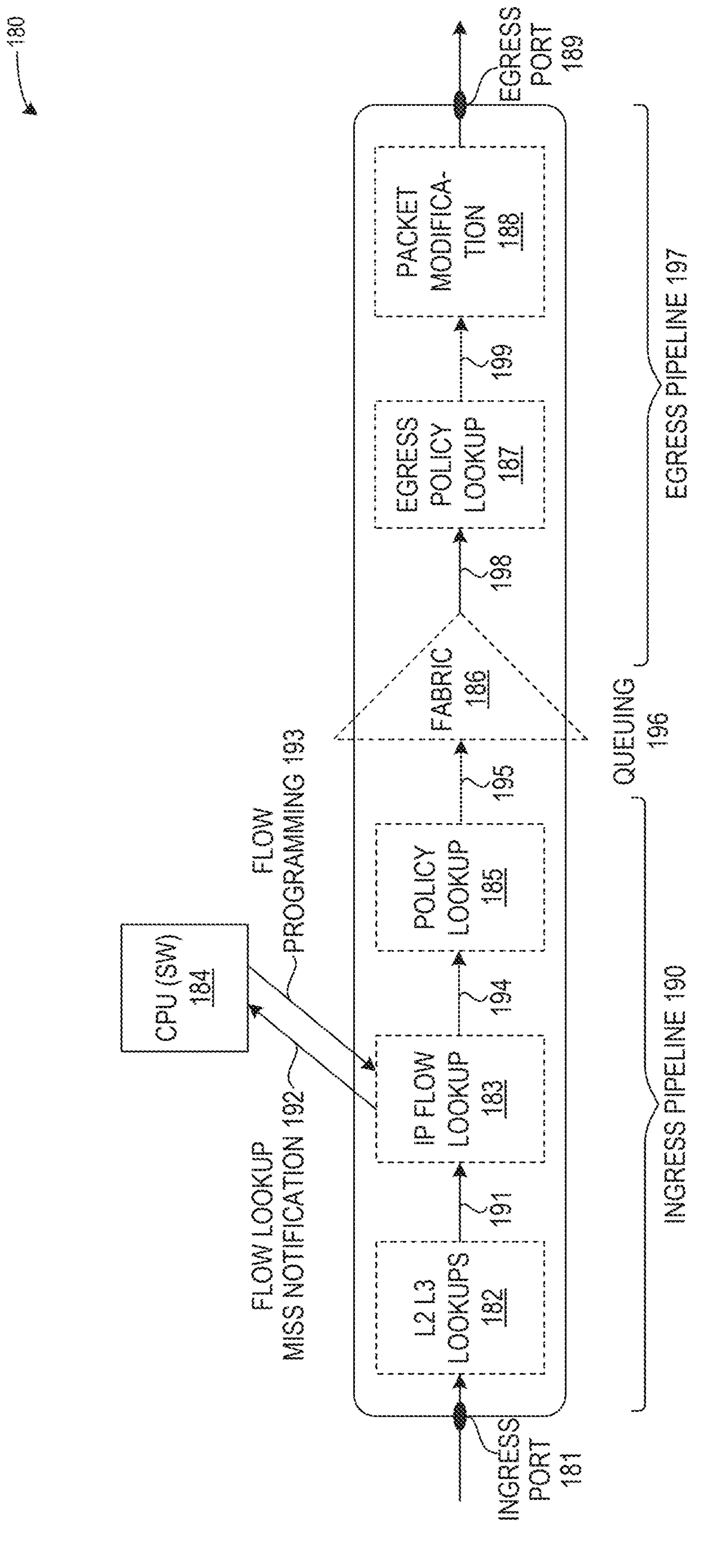
FIG. 1B illustrates a flow through a network device, in accordance with an aspect of the present application.

FIG. 1B illustrates a flow 180 through a network device, in accordance with an aspect of the present application. A packet of flow 180 may arrive at an ingress port 181, travel through an ingress pipeline 190, a queuing stage 196, and an egress pipeline 197, and exit at an egress port 189 of the network device. The network device may learn about new flows and may also track statistics associated with new flows by using a 5-tuple IP-flow table in the datapath, e.g., a datapath flow table programmed by an ASIC or SW-based fast path. When the network device learns a new flow, the network device may associate a counter resource with the new flow and record statistics associated with the new flow in the datapath flow table.

In some instances, the network device may use a SW "slow path" to assist in programming the flow table, as described below. For example, for a packet arriving at the network device via ingress port 181, the network device may perform L2/L3 lookups 182 and an IP flow lookup 183 in the datapath flow table (not shown). If the datapath flow table lookup 183 returns a "miss," the network device may use an SW-based slow path to assist in programming the flow table by sending a flow lookup miss notification 192 to CPU/SW 184, which can program the flow into the flow table (as indicated by a flow programming 193 communication). The original packet which triggered the flow miss may be dropped, and once the SW-based slow path has programmed the flow into the flow table (i.e., based on communications 192 and 193), the traffic may be datapath-switched, as it no longer results in a miss on the flow table.

The network device may subsequently perform a policy lookup 185 prior to queuing stage 196 as the packet travels through a fabric 186. The network device may also perform an egress policy lookup 187 and a packet modification 188 prior to transmitting the packet out via egress port 189. While the path of a packet in flow 180 is depicted by communications 191, 194, 195, 198, and 199, other communications and operations may occur for a packet of a flow through the network device.

In this disclosure, communication from a client to an upstream destination (either internal or external to the network fabric) may be referred to as a "Client to Server" (C2S) flow, and the reverse or return communication may be referred to as a "Server to Client" (S2C) flow. A network access switch with IPFIX configured on its uplink and downlink ports may receive a C2S flow on a downlink port (e.g., a client-facing interface). The network access switch may record the relevant 5-tuple for the C2S flow in its flow table. When the reverse S2C flow ingresses the network device via an uplink port, the network device may also record the relevant 5-tuple for the S2C flow in the flow table.

For example, in environment 100 in FIG. 1A, access switch 112 may include ports configured with IPFIX: a downlink port 130 coupled to downstream clients 118; and uplink ports 132 and 134 coupled to, respectively, aggregation layer switches 114 and 116. Similarly, access switch 122 may include: a downlink port 140 coupled to downstream clients 128; and uplink ports 142 and 144 coupled to, respectively, aggregation layer switches 124 and 126. As indicated by an index 170, an IPFIX-enabled interface 101 can be indicated by an oval with a solid shading.

During operation, traffic may flow from downstream client 118 to a destination outside the network fabric, e.g., from client 118 to access switch 112 to aggregation layer switch 116 to WAN router 110 (C2S flow 160). When this C2S flow 160 ingresses at downlink port 130, access switch 112 may record the relevant 5-tuple C2S flow in its flow table. When the reverse S2C flow 162 ingresses at uplink port 132, access switch 112 may also record the relevant 5-tuple for the S2C flow in the flow table. Since both the C2S and S2C flows are recorded as ingressing at IPFIX-configured ports (130-134), access switch 112 may send an IPFIX record (or report) 164 relating to both those flows to collector 108, on a periodic basis or based on other predetermined conditions, e.g., the counter reaching a certain threshold number of bytes or packets processed, a predetermined amount of time having passed, or other statistics monitored by the network device and compared against a predetermined threshold.

However, traffic may also flow from clients on access switch 112 to clients on access switch 122 (e.g., flows 166 and 168, also referred to as East-West traffic). In this case, both access switch 112 and access switch 122 may record the same IP-flows and report duplicate records to collector 108. That is, C2S flow 166 and reverse S2C flow 168 are recorded and reported by access switch 112 as ingressed at its downlink and uplink ports (130-134), as indicated by IPFIX record 164. Similarly, the C2S flow 166 and reverse S2C flow 168 are recorded and reported by access switch 122 as ingressed at its downlink and uplink ports (140-144), as indicated by a duplicate IPFIX record 165.

Duplicate records in the case of East-West traffic between endpoints in the same network fabric may result in at least two issues. First, the volume of IPFIX reports received and processed by the collector may create an unnecessary load due to these duplicate records, as the collector will see IPFIX records or reports for the same flows twice. For example, in a site that hosts 1,000 endpoints (e.g., personal computers (PCs), mobile phones, tablets, cameras, printers, scanners, door badges, etc.), each endpoint may generate approximately five new connections per second. This can result in 5,000 new flows in the C2S direction and another 5,000 flows in the reverse S2C direction on a per second basis, which can further result in a total of 10,000 flows per second to export to a collector. If 15% of that volume is East-West traffic (e.g., a door badge talking to its controller, a camera to its digital video record (DVR), users to printers, etc.), this may result in 1,500 flows per second to be exported to the collector. A typical flow export window may be 30 seconds, and, given that window, this East-West flow count may be ~45,000 flows. Consider the case of two devices exporting this to the same collector. Such a case may result in 45,000 additional flow reports for every update cycle. Thus, the duplicate flow records may unnecessarily increase the load on the collector.

A second issue may arise when the collector is on the cloud instead of on-premises. In this case, extra data bandwidth may be consumed when transmitting duplicate information over the WAN, which may increase the WAN cost. Furthermore, the additional load may raise the cloud hosting cost. For example, each flow record for IPv6 can be ~150 B (5-tuple+64 b counters+other flow attributes) and for 45,000 flows, this may result in ~7.5 MB of additional data to be sent every 30 seconds that can be saved. While this may be a pre-compression number for the IPFIX records data, and it is possible to compress and send the same data, not all collectors may be capable of uncompressing this IPFIX data.

The described aspects address these issues by providing two solutions, depending on the type of network fabric deployed. The first solution can be used for overlay networks, such as EVPN or VxLAN-based network fabrics, and the second solution can be used for non-overlay networks.

Solution for Overlay Networks

Figure 2A:
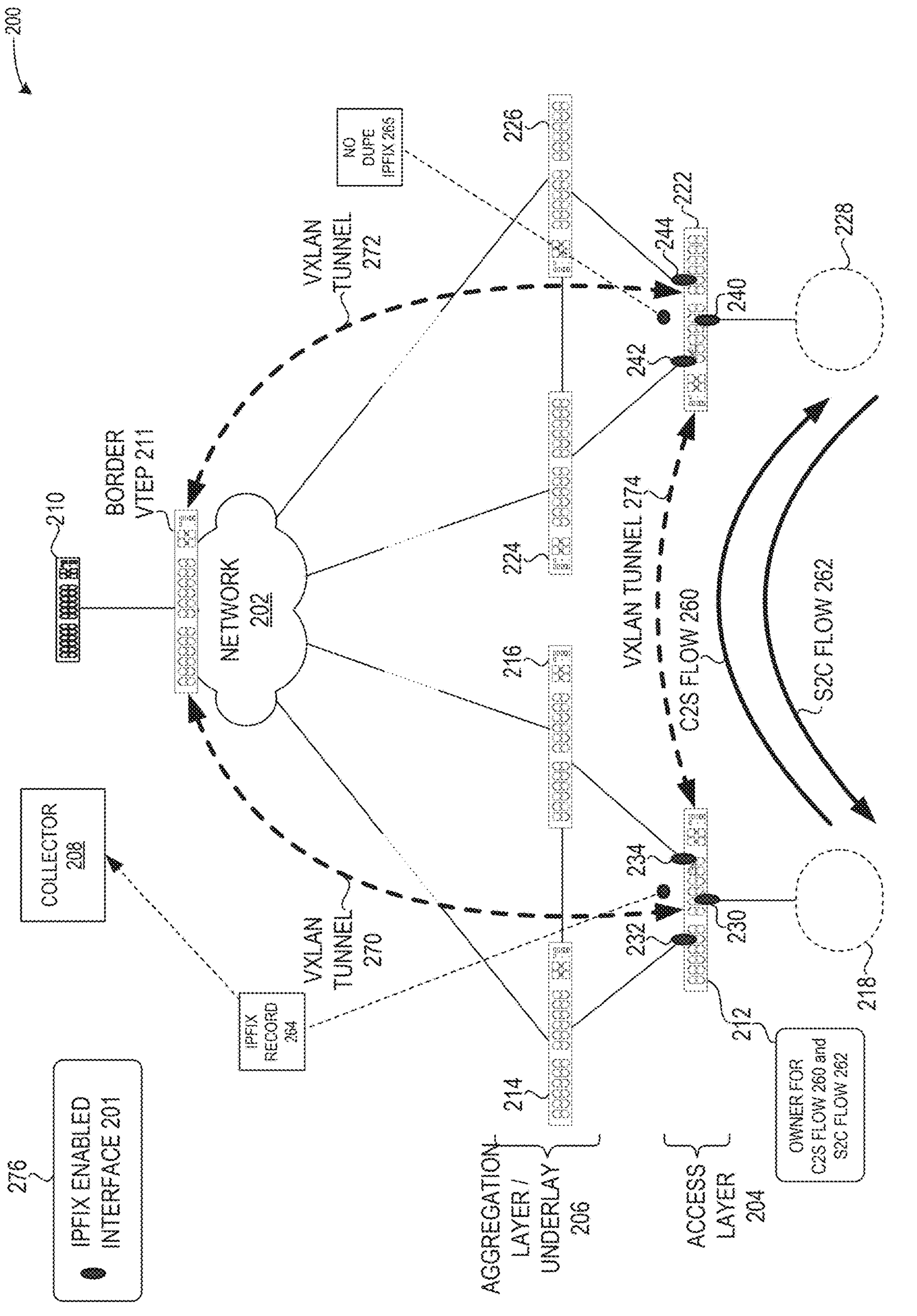
FIG. 2A illustrates an environment which facilitates avoiding duplicate IPFIX flow records in an overlay network, in accordance with an aspect of the present application.

An EVPN/VxLAN-based network can include a full mesh of VxLAN tunnels for traffic between any two endpoints, e.g., Virtual Tunnel Endpoints (VTEPs). FIG. 2A illustrates an environment 200 which facilitates avoiding duplicate IPFIX flow records in an overlay network, in accordance with an aspect of the present application. In environment 200, a Layer-3 underlay can include a full mesh of VxLAN tunnels for traffic between any two endpoints. All access switches in environment 200 may be VTEPs, including: an access layer 204 which includes access VTEPs 212 and 222; an aggregation layer/underlay 206 which includes intermediate fabric switches 214, 216, 224, and 226; a WAN router 210 associated with an upstream network 202; a border VTEP 211 with an uplink to WAN router 210; and a collector 208. Traffic can flow between each pair of VTEPs over a VxLAN tunnel, e.g.: a VxLAN tunnel 270 between access VTEP 212 and border VTEP 211; a VxLAN tunnel 272 between access VTEP 222 and border VTEP 211; and a VxLAN tunnel 274 between access VTEP 212 and access VTEP 222.

A downstream client 218 may communicate, via access VTEP 212, with devices behind WAN router 211 (e.g., via VxLAN tunnel 270) or with other clients behind access VTEP 222 (e.g., via VxLAN tunnel 274), and a downstream client 228 may similarly communicate, via access VTEP 222, with devices behind WAN router 211 (e.g., via VxLAN tunnel 272) or with other clients behind access VTEP 212 (e.g., via VxLAN tunnel 274).

The described aspects can ensure, for East-West traffic flowing between access VTEPs 212 and 222 for both of their respective downlink and uplink ports, that only one of the VTEPs is tracking both sides of a connection (i.e., the flow and the corresponding reverse flow) for IPFIX reporting.

Access VTEPs 212 and 222 may include ports configured with IPFIX. For example, access VTEP 212 may include: a downlink port 230 coupled to downstream client 218; and uplink ports 232 and 234 coupled to, respectively, intermediate fabric switches 214 and 216. Similarly, access VTEP 222 may include: a downlink port 240 coupled to downstream client 228; and uplink ports 242 and 244 coupled to, respectively, intermediate fabric switches 224 and 226. As indicated by an index 276, an IPFIX-enabled interface 201 can be indicated by an oval with a solid shading.

During operation, traffic may flow from downstream client 218 (which is behind access VTEP 212) to a downstream client 228 (which is behind access VTEP 222, which is in the same network fabric as access VTEP 212). Client 218 may initiate a new 5-tuple IP-flow to client 228 (i.e., C2S flow 260). Access VTEP 212 may receive the C2S flow 260 at ingress on a downlink port 230, perform a datapath flow table lookup, identify a "miss," and (with SW slow path assistance as described above) record the C2S flow 260 into the ASIC datapath flow table and begin tracking the C2S flow 260. Because IPFIX has been enabled or configured on ingress downlink port 230, access VTEP 212 can assign counter resources to this C2S flow and begin tracking statistics to be subsequently exported to collector 208. Additionally, VTEP 212 can preemptively record the corresponding reverse S2C flow 262 in the flow table in order to track that return flow. Similarly, because IPFIX has been configured on ingress uplinks 232 and 234, access VTEP 212 can also assign counter resources to the reverse S2C flow 262 in order to track statistics to be subsequently exported to collector 208.

Access VTEP 212 can assign the counter resources by, e.g., setting a bit in the entry in the flow table for the respective flow, which indicates that access VTEP 212 is the "anchor node" or "owner" (as indicated by the label on VTEP 212: "Owner for C2S flow 260 and S2C flow 262") for IPFIX reporting related to the C2S flow 260 and the reverse S2C flow 262. Access VTEP 212 can also perform a standard forwarding lookup (e.g., to determine whether the traffic is bridged or routed) and determine that the C2S flow 260 is to egress VxLAN tunnel 274 (between access VTEPs 212 and 222). Access VTEP 212 may insert, into a header of a packet or frame in the C2S flow 260 (e.g., the VxLAN header), the appropriate L2/L3 Virtual Network Identifier (VNI) based on whether the traffic is bridged or routed. In addition, access VTEP 212 may set a flag in the 8-bit flag field of the VxLAN header (as described below in relation to FIG. 2B), which indicates that the C2S flow 260 is being tracked on access VTEP 212. This flag can indicate to a remote switch that access VTEP 212 is the IPFIX anchor node or owner for this flow.

Figure 2B:
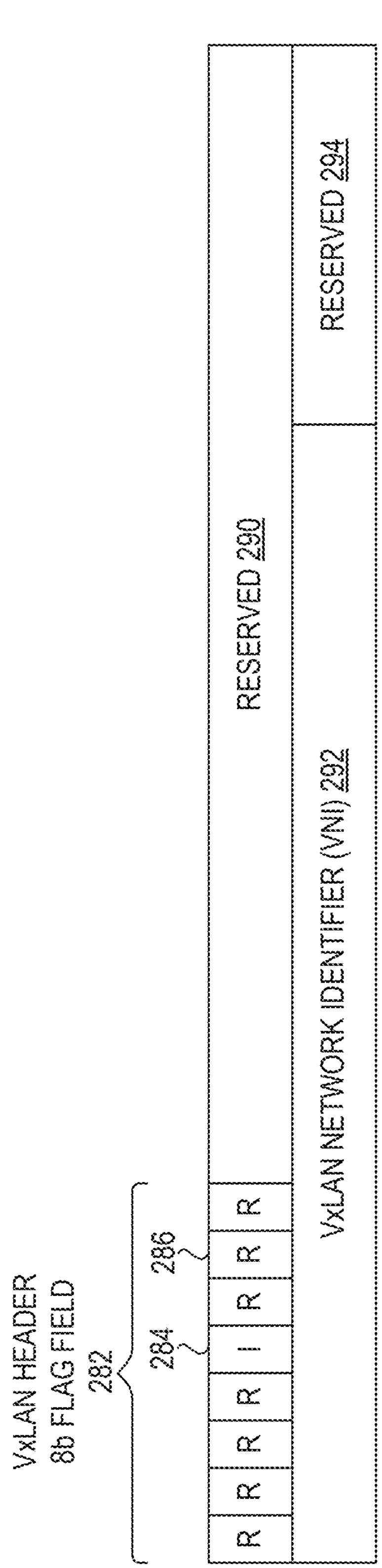
FIG. 2B illustrates a Virtual Extensible Local Area Network (VxLAN) header which facilitates avoiding duplicate IPFIX flow records in an overlay network, in accordance with an aspect of the present application.

FIG. 2B illustrates a VxLAN header 280 which facilitates avoiding duplicate IPFIX flow records in an overlay network, in accordance with an aspect of the present application. VxLAN header 280 may be an 8-byte field and can include: an 8-bit flag field 282; reserved fields (24 bits) 290; a VxLAN identifier (VNI) field (24 bits) 292; and reserved fields (8 bits) 294. VxLAN header flag field 282 can include an "I" flag set to a value of "1" to indicate a valid VNI. The described aspects can use one of the remaining seven reserved bits of VxLAN header flag field 282 (e.g., bit 7, indicated by an element 286) to indicate that the source of the packet is the IPFIX owner for the flow corresponding to the packet encapsulated with the VxLAN header.

Returning to FIG. 2A, access VTEP 212 can send this VxLAN-encapsulated packet carrying the C2S flow 260 as its payload, and the packet can arrive at access VTEP 222. Access VTEP 222 may receive the C2S flow 260 flow at ingress on, e.g., uplink port 242. VTEP 222 can decapsulate the VxLAN header, use the L2/L3 VNI for forwarding lookups, and check bit 7 of the 8-bit flag field to determine whether the source is already tracking the flow. Access VTEP 222 can also perform a datapath flow table lookup, identify a "miss," and (with SW slow path assistance as described above) record the C2S flow 260 into the ASIC datapath flow table and may also cache the C2S flow 260 in its SW copy of the flow table. Access VTEP 222 can also record the reverse S2C flow 262 in the flow table.

However, because access VTEP 222 may have determined, based on the set bit-7 in the VxLAN header, that the source (VTEP 212) is already tracking this C2S flow 260, access VTEP 222 can refrain from marking itself as the owner for both the C2S flow 260 and the reverse S2C flow 262. That is, VTEP 222 can refrain from assigning counter resources to the C2S flow 260 and the reverse S2C flow 262, which indicates that access VTEP 222 is not the owner for IPFIX reporting related to these two flows. Instead, VTEP 212 is the owner for these two flows. As a result, VTEP 222 will not periodically poll for statistics on these flows and will not include these flows in any IPFIX reporting to collector 208, i.e., refrain from exporting to collector 208 IPFIX information associated with these flows.

Client 228 behind access VTEP 222 may receive and respond to the C2S flow 260 by initiating the reverse S2C flow 262. Access VTEP 222 may receive a packet of the S2C flow 262 (e.g., on its downlink 240), perform a lookup in its flow table to determine that another VTEP (212) has already been assigned as the owner for the S2C flow 262, and encapsulate the packet with the VxLAN header without setting the 7-bit, because access VTEP 222 is not the owner for this flow.

Access VTEP 222 may send the encapsulated packet to access VTEP 212. Upon receiving the encapsulated packet, access VTEP 212 can decapsulate the packet, obtain the L2/L3 VNI, and determine the bit-7 VxLAN flag information. Access VTEP 212 may perform a lookup in its flow table for the reverse S2C flow 262, determine that the reverse S2C flow 262 has been (previously) recorded in the flow table, determine that counter resources have been assigned and updated, and, accordingly, export IPFIX flow records to collector 208 (e.g., as shown by IPFIX record 264).

In some aspects, the EVPN control plane may be extended with a bit for signaling this "owner" capability (e.g., by using an extended community), which may allow two Border Gateway Protocol (BGP) neighbors that support this functionality to parse bit-7 of the VxLAN header in the manner described above. If one neighbor supports this functionality and another neighbor does not, the non-supporting neighbor can simply ignore the bit in the VxLAN header and may continue to send duplicate IPFIX records as described above. Extending the EVPN control plane in this manner may result in incrementally extending the de-duplication solution to an entire network without requiring an upgrade or modification to the entire network.

Thus, as depicted above in relation to FIG. 2A, the access VTEP (212) which receives the first direction of a new flow can become the IPFIX owner for the flow. As the IPFIX owner, that access VTEP (212) can assign counter resources to the new flow and the corresponding reverse flow, and that access VTEP (212) can also set bit-7 in the VxLAN header when encapsulating a packet for transmission to a remote VTEP through the network fabric (e.g., over a VxLAN tunnel). The remote access VTEP (222) can determine, based on the bit in the VxLAN header, that it is not the IPFIX owner for the flow. The remote access VTEP (222) can cache the flow in software and record the flow in its datapath flow table while refraining from setting the "assign resources" indicator (also referred to as the "anchor flag"). This lack of the set indicator can ensure that the remote access VTEP (222) does not set the bit-7 in the VxLAN header when tunneling traffic (i.e., encapsulated packets) over VxLAN tunnel 274 and can further ensure that no duplicate IPFIX record is to be transmitted to collector 208 (as indicated by a label 265: "No duplicate IPFIX record").

In the case of North-South traffic flowing from access VTEP 212 to an external destination (e.g., with an IP address outside of the network fabric), access VTEP 212 can treat itself as the owner for such a flow, record the flow and the reverse flow in its flow table, assign the counter resources to the flow and the reverse flow, set the bit-7 in the VxLAN header, and transmit the encapsulated packet towards its destination. Border VTEP 211 can receive and decapsulate the encapsulated packet and, because IPFIX is not enabled on its ports, border VTEP 211 can simply ignore the bit and perform its normal forwarding, e.g., to WAN router 210. Similarly, the reverse flow from received by access VTEP 212 from border VTEP 211 will not have the bit-7 set, and access VTEP 212 can continue to be the IPFIX owner of the flow and the reverse flow. Similar operations may occur for North-South traffic flowing from remote access VTEP 222 to an external destination.

Figure 3:
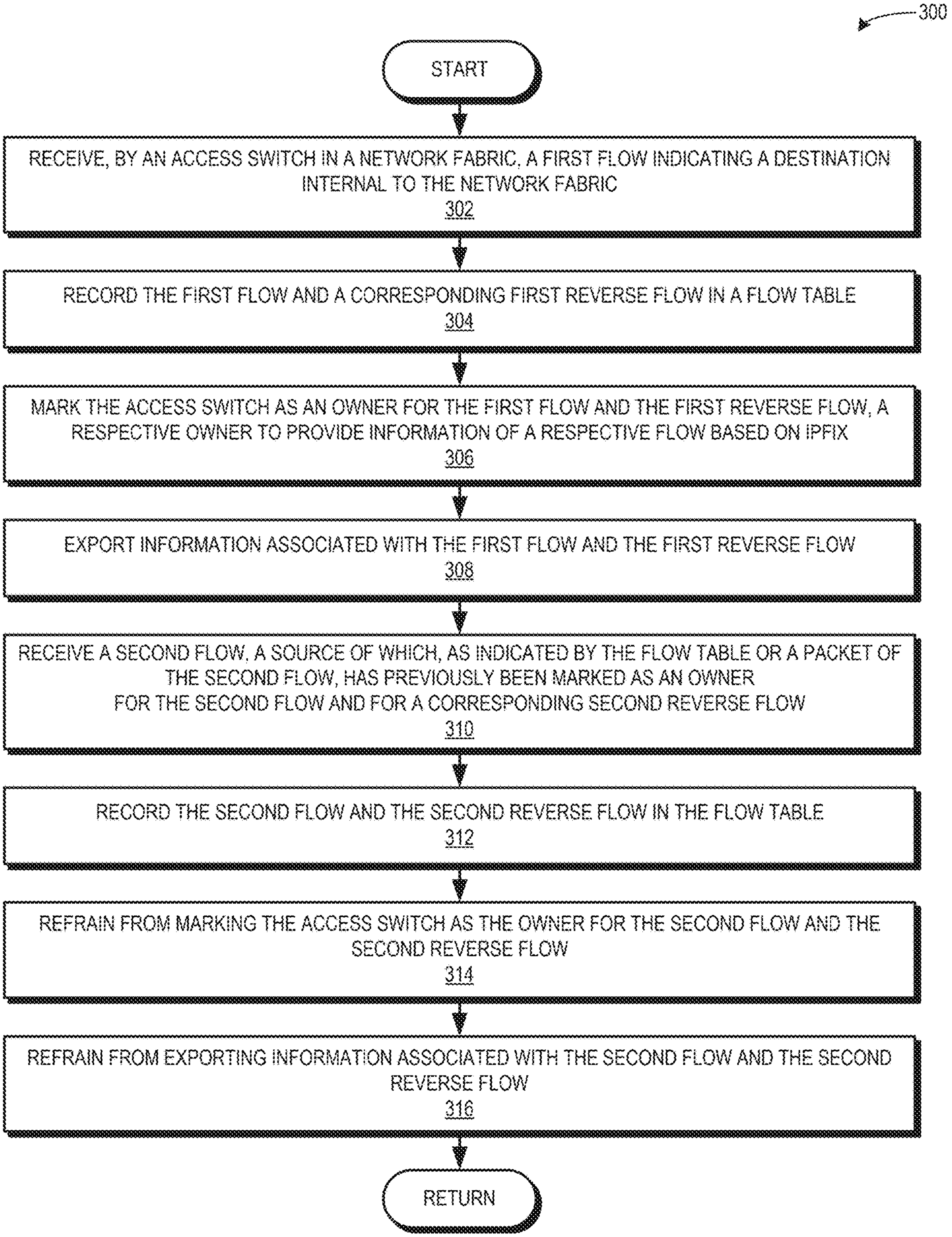
FIG. 3 presents a flowchart illustrating a method which facilitates avoiding duplicate IPFIX flow records in an overlay network, in accordance with an aspect of the present application.

FIG. 3 presents a flowchart 300 illustrating a method which facilitates avoiding duplicate IPFIX flow records in an overlay network, in accordance with an aspect of the present application. During operation, the system receives, by an access switch in a network fabric, a first flow indicating a destination internal to the network fabric (operation 302). For example, as depicted above in relation to FIG. 2A, access VTEP 212 receives a C2S flow 260 from downstream client 218, and the C2S flow 260 indicates a destination internal to the network (e.g., a downstream client 228 behind access VTEP 222).

The system (i.e., the access switch) records the first flow and a corresponding first reverse flow in a flow table (operation 304). Access VTEP 212 may record, in its datapath flow table in the ASIC, a 5-tuple of information associated with both the C2S flow 260 and the S2C flow 262 described above in relation to FIG. 2A. If a lookup "miss" occurs, access VTEP 212 may use software to assist in programming the flow table, as described above in relation to the datapath of FIG. 1B.

The system marks the access switch as an owner for the first flow and for the first reverse flow, a respective owner to provide information associated with a respective flow based on IPFIX (operation 306). For example, access VTEP 212 may associate or assign a counter resource with the first flow and the first reverse flow and record statistics about those flows in the flow table. The counter resource may track a number of bytes or packets of the respective flow which are processed by or travel through access VTEP 212. That is, access VTEP 212 may track a count associated with packets of the first flow and the first reverse flow. Access VTEP 212 may mark itself as the IPFIX owner for the first flow and the first reverse flow by setting a first corresponding indicator in the flow table. Access VTEP 212 may also mark itself as the IPFIX owner for the first flow and the first reverse flow by setting a first value in a fabric header of a packet of the first flow, as described above in relation to the bit-7 value in flag field 282 of VxLAN header 280 of FIG. 2B.

The system exports information associated with the first flow and the first reverse flow (operation 308). A network device which is configured based on IPFIX may export to a collector relevant IPFIX information on a periodic basis or based on other predetermined conditions, e.g., the counter reaching a certain threshold number of bytes or packets processed, a predetermined amount of time having passed, or other statistics monitored by the network device and compared against a predetermined threshold. For example, access VTEP 212 may send (i.e., export) to collector 208 an IPFIX flow record 264 associated with the first flow (C2S flow 260) and the first reverse flow (S2C flow 262) every 30 seconds or upon detecting that at least 256 bytes have been processed, as depicted above in relation to FIG. 2A. The relevant information may include the 5-tuple information and other statistics tracked or gathered by the access switch (i.e., by access VTEP 212).

The system receives a second flow, a source of which, as indicated by the flow table or a packet of the second flow, has previously been marked as an owner for the second flow and for a corresponding second reverse flow (operation 310). The second flow may correspond to, e.g., the C2S flow 260 as received by remote access VTEP 222 in FIG. 2A, and that C2S flow 260 may include a VxLAN header with bit-7 set indicating that the source has already been marked as the owner for the second flow and the second reverse flow. In some aspects, the received second flow is the reverse second flow received by the remote access VTEP 222, in which case its flow table can indicate that another VTEP has already been marked as the owner for the second flow and the second reverse flow (e.g., based on the corresponding indicator for assigning counter resources set in the flow table).

The system records the second flow and the second reverse flow in the flow table (operation 312). For example, access VTEP 222 records the second flow and the reverse second flow (respectively, the received C2S flow 260 and the expected S2C flow 262) in its flow table, as described above in relation to FIG. 2A.

The system refrains from marking the access switch as the owner for the second flow and the second reverse flow (operation 314). Continuing with the example of access VTEP 222 in FIG. 2A, access VTEP 222 refrains from marking itself as the owner for the second flow and the second reverse flow. That is, access VTEP 222 may refrain from tracking a second count associated with packets of the second flow (260) and the second reverse flow (262) by refraining from setting a second corresponding indicator in the flow table. Upon receiving the second reverse flow, access VTEP 222 may also reset a second value in a fabric header (e.g., bit-7 of a VxLAN header) of a packet of the second reverse flow (e.g., when encapsulating a packet of the second reverse flow with the VxLAN header for transmission through the network fabric over VxLAN tunnel 274), as described above in relation to FIG. 2A. Resetting the second value may indicate that the source of the flow (here, VTEP 222) is not the owner of the flow.

The system refrains from exporting information associated with the second flow and the second reverse flow (operation 316). Thus, even if access VTEP 222 has ports configured with IPFIX, VTEP 222 may not export information associated with the second flow (260) and the second reverse flow (262) because access VTEP 222 is not marked as the IPFIX owner for those flows. The operation returns.

Solution for Non-Overlay Networks

In a non-overlay network fabric (e.g., a non-EVPN traditional network fabric), traffic flowing through the network fabric does not include any VxLAN encapsulation and instead flows through the network fabric as native Ethernet frames. As a result, an access switch cannot signal in the datapath to a remote access switch that it is the IPFIX owner for a given flow. In this case, the described aspects can determine two attributes which can guide the flow-learning process: whether a source IP or destination IP is on a same or a different subnet than the access switch; and whether the flow is received on an uplink port or a downlink port of the access switch.

For the first attribute, a network management station (such as Aruba Central or Intelligent Management Center (IMC)) may possess knowledge of which IP prefixes belong to a fabric or site (e.g., a corporate subnet). This information can be pushed to the access switches which are enabled or configured for IPFIX. A network management station may also push this information to the access switches based on its global view of the network or based on device fingerprinting applications running on the management stations.

For the second attribute, access switches can automatically discover their uplink and downlink ports based on Link Layer Discovery Protocol (LLDP) information exchanged with their neighbors. If an endpoint advertises itself as a switch or router or access-point on a port of an access switch, the port will be considered an uplink port of the switch. If there is either no LLDP neighbor information on a port or the neighbor information indicates that it is a camera or a phone or an endpoint of any other type, the port will be considered a downlink port.

Figure 4:
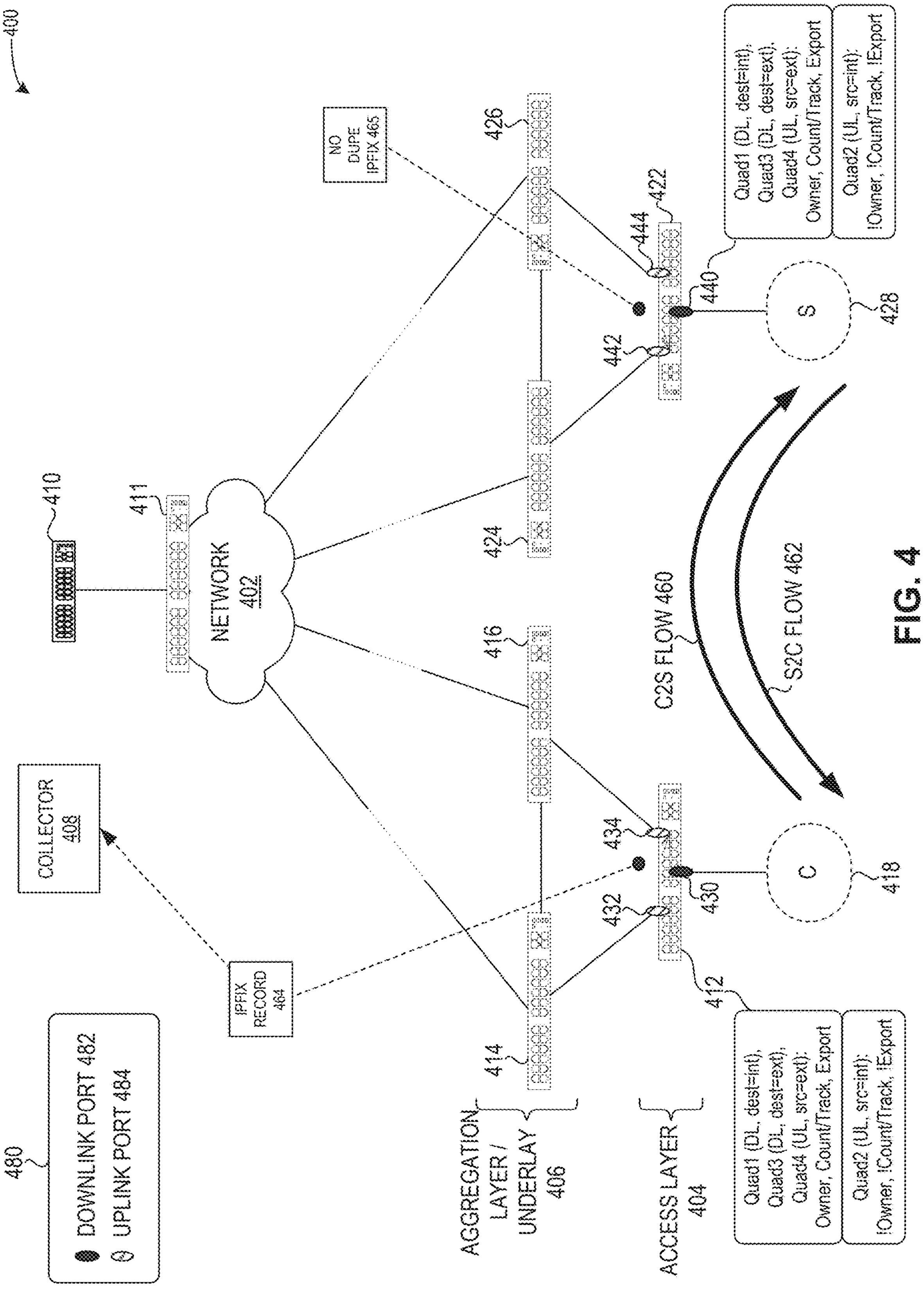
FIG. 4 illustrates an environment which facilitates avoiding duplicate IPFIX flow records in a non-overlay network, in accordance with an aspect of the present application.

FIG. 4 illustrates an environment 400 which facilitates avoiding duplicate IPFIX flow records in a non-overlay network, in accordance with an aspect of the present application. Environment 400 can depict a network fabric with network devices, including: an access layer 404 which includes access switches 412 and 422; an aggregation layer 406 which includes switches 414, 416, 424, and 426; a WAN router 410 associated with an upstream network 402; a switch 411; and a collector 408. Access switch 412 may communicate with aggregation layer switches 414 and 416, which may communicate with switch 411 or WAN router 410 for communication outside of the network fabric. Switches 414 and 416 may also communicate, via upstream network 402, with aggregation layer switches 424 and 426, which in turn may communicate with access switch 422. A downstream client 418 may communicate with other clients via access switch 412, and a downstream client 428 may similarly communicate with other clients via access switch 422.

In environment 400, access switch 412 may include ports configured with IPFIX: a downlink port 430 coupled to downstream clients 418; and uplink ports 432 and 434 coupled to, respectively, aggregation layer switches 414 and 416. Similarly, access switch 422 may include: a downlink port 440 coupled to downstream clients 428; and uplink ports 442 and 444 coupled to, respectively, aggregation layer switches 424 and 426. As indicated by an index 480, a downlink (DL) port 482 can be indicated by an oval with a solid shading and an uplink (UL) port 484 can be indicated by an oval with a diagonally right-slanting pattern.

In the described aspects, access switches may avoid duplicate IPFIX flow records based on a determination of the two above-described attributes: whether the flow is received on an uplink port or a downlink port of the access switch; and whether a source IP or destination IP is on a same or a different subnet than the access switch (respectively, internal or external). For example, access switch 412 may learn a new flow on downlink port 430 (i.e., an endpoint-facing port) and check whether the destination is internal or external, e.g., whether the destination IP address of the new flow is part of the same subnet (internal) or if the destination IP address of the new flow is not part of the same subnet (external) and therefore outside of its administrative control. If the destination is internal, access switch 412 records the flow and the reverse flow in its flow table, marks itself as the IPFIX owner for the flow and the reverse flow, assigns counter resources to the flow and the reverse flow, and exports collected IPFIX information relating to the flow and the reverse flow to the collector. Access switch 412 may also store a copy of the flow and the reverse flow in its software cache and mark them as an "anchor flow," i.e., a flow for which access switch 412 has been marked as the IPFIX owner. This case (downlink, destination "internal") is depicted as "Quadrant 1" below in FIG. 5 and also indicated in the labels for access switch 412: "Quad1 (DL, dest=int): Owner, Count/Track, Export" and, similarly, in the labels for access switch 422 when access switch 422 processes an incoming flow.

If the destination is external, access switch 412 must learn and record the flow and the reverse flow in its flow table, since access switch 412 will be the only node within the corporate subnet to report this flow and the reverse flow. As a result, access switch 412 records the flow and the reverse flow, marks itself as the IPFIX owner for the flow and the reverse flow, assigns counter resources to the flow and the reverse flow, and exports collected IPFIX information relating to the flow and the reverse flow to the collector. This case (downlink, destination "external") is depicted as "Quadrant 3" below in FIG. 5 and also indicated in the labels for access switch 412: "Quad3 (DL, dest=ext): Owner, Count/Track, Export" and, similarly, in the labels for access switch 422 when access switch 422 processes an incoming flow.

Access switch 412 may also learn a new flow on uplink port 432 (i.e., an aggregation-facing port) and check whether the source is internal or external, e.g., whether the source IP address of the new flow is part of the same subnet (internal) or if the source IP address of the new flow is not part of the same subnet (external) and therefore outside of its administrative control. If the source is internal, access switch 412 records the flow in its flow table, but refrains from marking itself as the IPFIX owner, refrains from assigning counter resources to the flow, and refrains from exporting collected IPFIX information to the collector. Access switch 412 may also store a copy of the flow in its software cache and mark the flow as a "non-anchor flow," i.e., a flow for which access switch 412 has not been marked as the IPFIX owner. That is, since the source is internal, this indicates that another access switch must have already marked itself as the owner for this flow. This case (uplink, source "internal") is depicted as "Quadrant 2" below in FIG. 5. This case is also indicated in the labels for access switch 412: "Quad2 (UL, src=int): !Owner, !Count/Track, !Export" and, similarly, in the labels for access switch 422 when access switch 422 processes an incoming flow.

If the source is external, access switch 412 must learn and record the flow and its reverse flow in its flow table, because access switch 412 will be the only node within the corporate subnet to report this flow and the reverse flow. As a result, access switch 412 records the flow and the reverse flow in its flow table, marks itself as the IPFIX owner for the flow and the reverse flow, assigns counter resources to the flow and the reverse flow, and exports collected IPFIX information relating to the flow and the reverse flow to the collector. This case (uplink, source "external") is depicted as "Quadrant 4" below in FIG. 5. This case is also indicated in the labels for access switch 412: "Quad4 (UL, src=ext): Owner, Count/Track, Export" and, similarly, in the labels for access switch 422 when access switch 422 processes an incoming flow.

Figure 5:
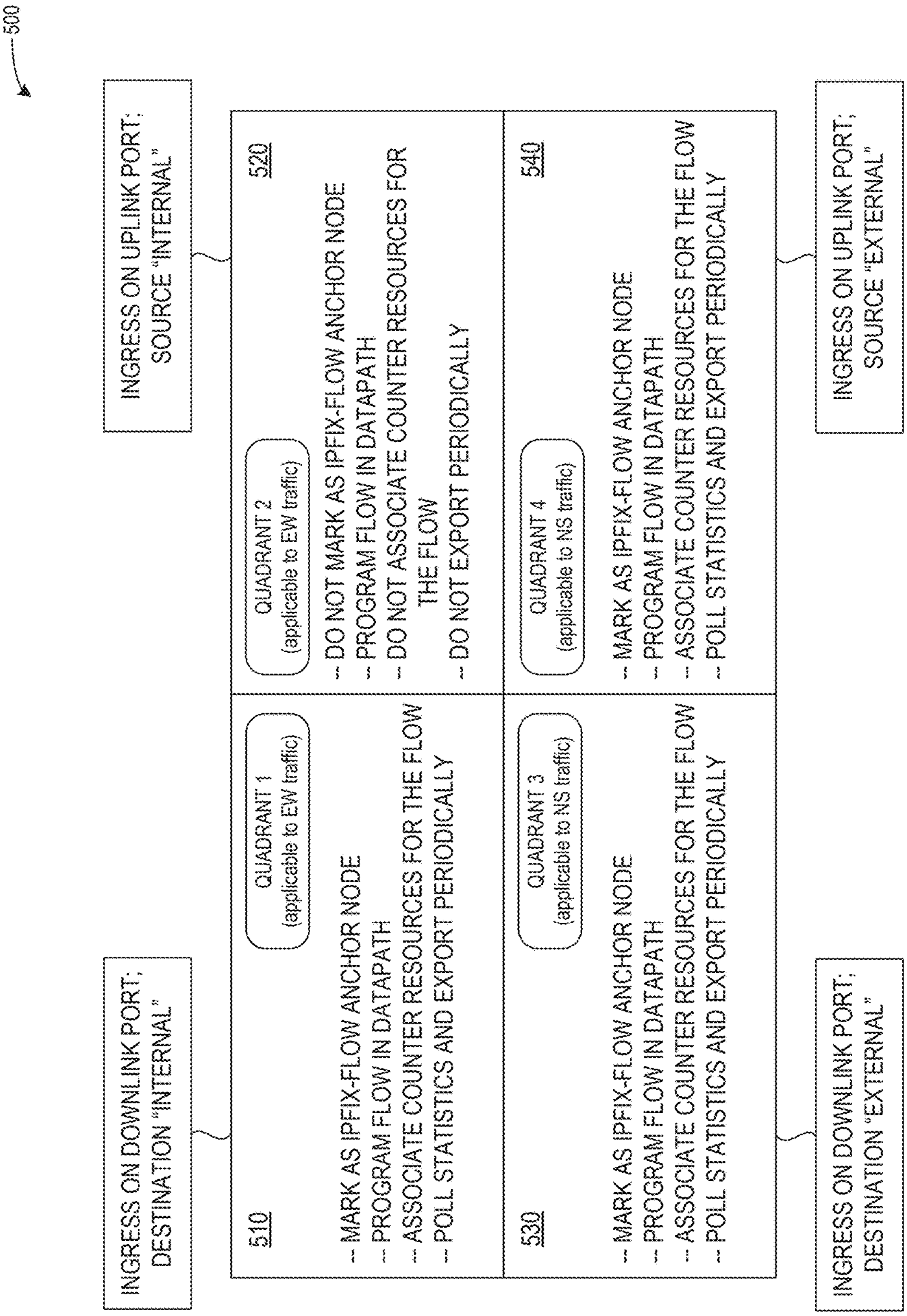
FIG. 5 illustrates a table which depicts a flow-learning process and related actions on access switches, in accordance with an aspect of the present application.

FIG. 5 illustrates a table 500 which depicts a flow-learning process and related actions on access switches, in accordance with an aspect of the present application. Table 500 includes four quadrants, each covering a combination of the two attributes described above in the non-overlay network solution. Quadrant 1 (as indicated by a label 510) can be applicable to East-West traffic and can cover the case of ingress on a downlink port where the destination is internal; Quadrant 2 (as indicated by a label 520) can be applicable to East-West traffic and can cover the case of ingress on an uplink port where the source is internal; Quadrant 3 (as indicated by a label 530) can be applicable to North-South traffic and can cover the case of ingress on a downlink port where the destination is external; and Quadrant 4 (as indicated by a label 540) can be applicable to North-West traffic and can cover the case of ingress on a uplink port where the source is external. The actions listed in each of the four quadrants is described above in relation to FIG. 4.

One main distinction can be seen from the description and the four quadrants in table 500. That is, specifically in the case of East-West traffic, where the ingress of a flow is received on an uplink port (i.e., an aggregation-facing port) of an access switch from an internal source (i.e., a source on a same subnet as the receiving access switch) (as in Quadrant 2 indicated by label 520), the receiving access switch refrains from marking itself as the owner for the flow and the reverse flow, programs the flow and the reverse flow in the datapath (i.e., records the flow and the reverse flow in the ASIC), refrains from assigning counter resources to the flow and the reverse flow, and does not export IPFIX information relating to the flow and the reverse flow to the collector.

Figure 6:
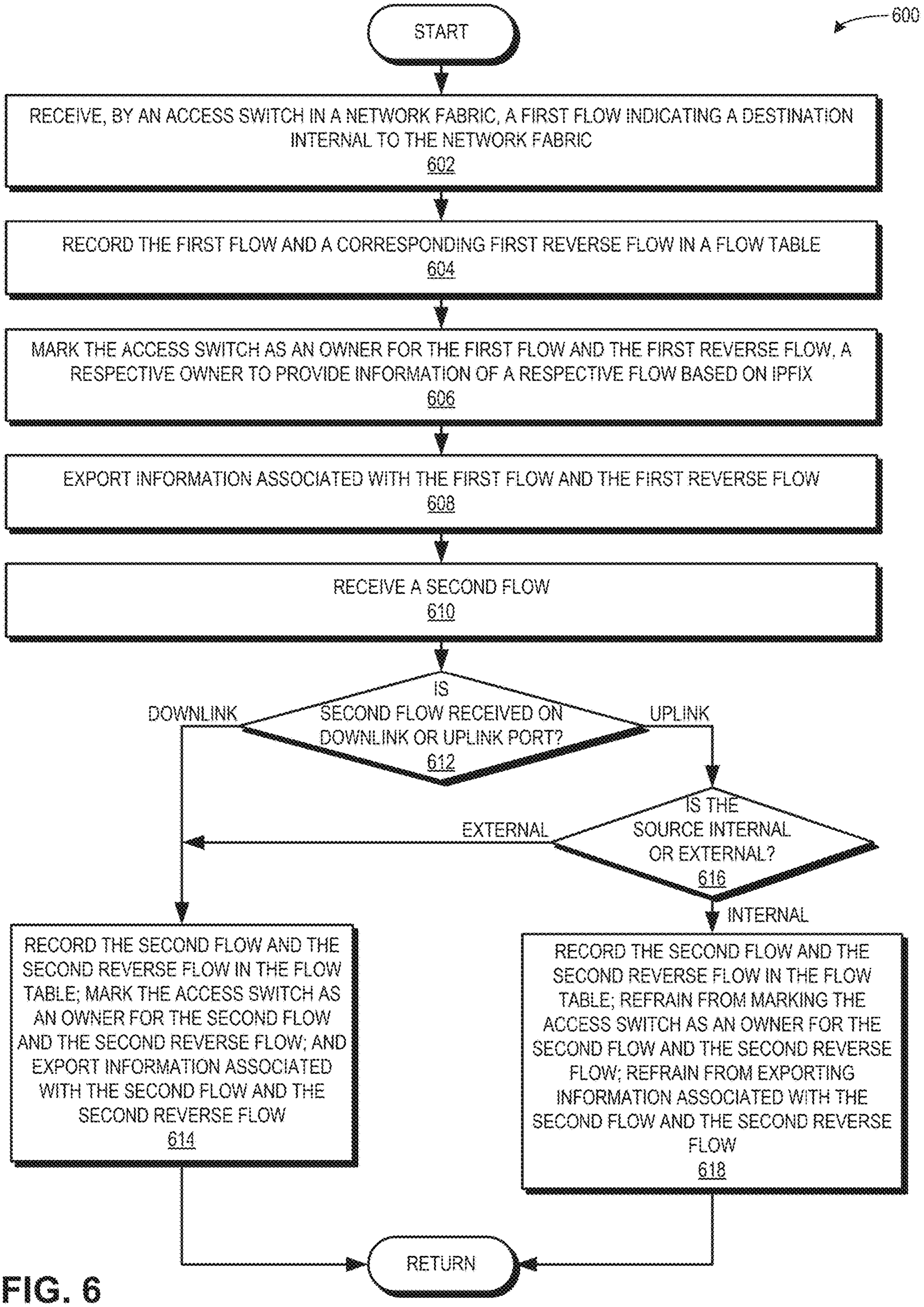
FIG. 6 presents a flowchart illustrating a method which facilitates avoiding duplicate IPFIX flow records in a non-overlay network, in accordance with an aspect of the present application.

FIG. 6 presents a flowchart 600 illustrating a method which facilitates avoiding duplicate IPFIX flow records in a non-overlay network, in accordance with an aspect of the present application. During operation, the system receives, by an access switch in a network fabric, a first flow indicating a destination internal to the network fabric (operation 602, similar to operation 302). For example, as depicted above in relation to FIG. 4, access switch 412 receives the C2S flow 460 from downstream client 418, and the C2S flow 460 indicates a destination internal to the network (e.g., a downstream client 428 behind access switch 422, where access switch 422 is in the same network fabric as access switch 412).

The system (i.e., the access switch) records the first flow and a corresponding first reverse flow in a flow table (operation 604, similar to operation 304). For example, access switch 412 may record, in its datapath flow table in the ASIC, a 5-tuple of information associated with both the C2S flow 460 and the S2C flow 462 described above in relation to FIG. 4. If a lookup "miss" occurs, access switch 412 may use software to assist in programming the flow table, as described above in relation to the datapath of FIG. 1B.

The system marks the access switch as an owner for the first flow and for the first reverse flow, a respective owner to provide information associated with a respective flow based on IPFIX (operation 606, similar to operation 306). For example, access switch 412 may associate or assign a counter resource with the first flow and the first reverse flow and record statistics about those flows in the flow table. The counter resource may track a number of bytes or packets of the respective flow which are processed by or travel through access switch 412. That is, access switch 412 may track a count associated with packets of the first flow and the first reverse flow. Access switch 412 may mark itself as the IPFIX owner for the first flow and the first reverse flow by setting a first corresponding indicator in the flow table. Access switch 412 may also mark itself as the IPFIX owner for the first flow and the first reverse flow by setting a first value in a fabric header of a packet of the first flow, as described above in relation to the bit-7 value in flag field 282 of VxLAN header 280 of FIG. 2B.

The system exports information associated with the first flow and the first reverse flow (operation 608, similar to operation 308). A network device which is configured based on IPFIX may export to a collector relevant IPFIX information on a periodic basis or based on other predetermined conditions, e.g., the counter reaching a certain threshold number of bytes or packets processed, a predetermined amount of time having passed, or other statistics monitored by the network device and compared against a predetermined threshold. For example, access switch 412 may send (i.e., export) to collector 408 an IPFIX flow record 464 associated with the first flow (C2S flow 460) and the first reverse flow (S2C flow 462) every 30 seconds or upon detecting that at least 256 bytes have been processed, as depicted above in relation to FIG. 4. The relevant information may include the 5-tuple information and other statistics tracked or gathered by the access switch (i.e., by access switch 412).

The system receives a second flow (operation 610), e.g., access switch 412 receives a flow (not shown) that is not the reverse of C2S flow 460 or access switch 422 receives the C2S flow 460 as the "second flow." While flows 460 and 462 are labeled as C2S or S2C flows in FIG. 4, these flows may also be referred to as "first flow" or "second flow" in the generic case of handling traffic in a non-overlay network.

The system determines whether the second flow is received on a downlink or an uplink port (decision 612). If the second flow is received on a downlink port (decision 612), the system records the second flow and the second reverse flow in the flow table, marks the access switch as the owner for the second flow and the second reverse flow, and exports information association with the second flow and the second reverse flow (operation 614, similar to operations 604, 606, and 608 for the first flow). Operation 614 corresponds to the cases in Quadrant 1 and Quadrant 3, as described above in relation to FIGS. 4 and 5.

If the second flow is received on an uplink port (decision 612), the system determines whether the source is internal or external (decision 616). For example, access switch 422 may determine whether the source IP address of received flow 460 is part of the same subnet (internal) or if the source IP address of received flow 460 is not part of the same subnet (external) and therefore outside of its administrative control. If the source is external (decision 616), the operation continues at operation 614, which in this instance corresponds to the case in Quadrant 4, as described above in relation to FIGS. 4 and 5.

If the source is internal (decision 616), the system records the second flow and the second reverse flow in the flow table, refrains from marking the access switch as the owner for the second flow and the second reverse flow, and refrains from exporting information association with the second flow and the second reverse flow (operation 618, similar to operations 312, 314, and 316 in FIG. 3). Operation 618 corresponds to the case in Quadrant 2, as described above in relation to FIGS. 4 and 5. The operation returns.

Figure 7:
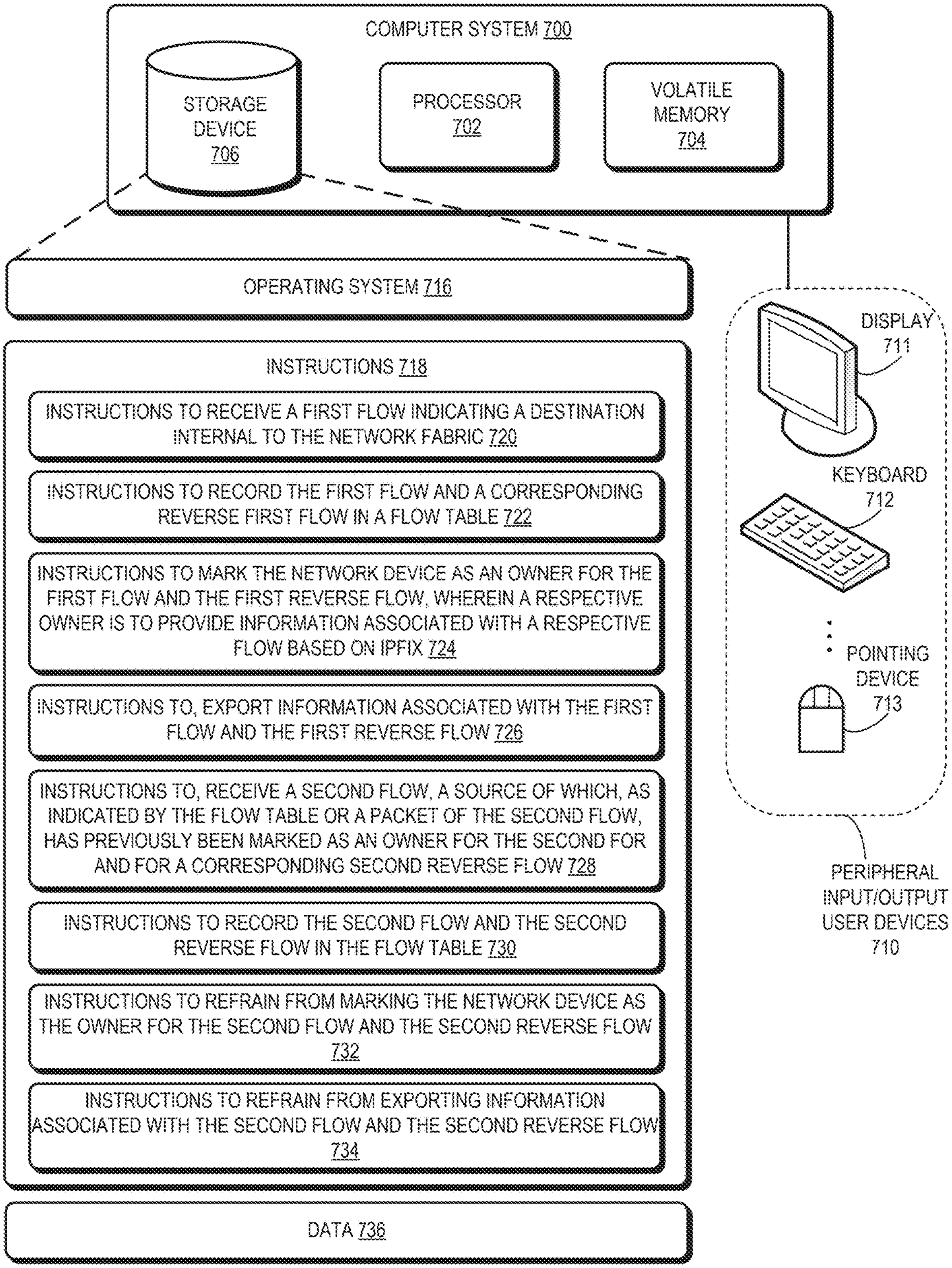
FIG. 7 illustrates a network device which facilitates avoiding duplicate IPFIX flow records, in accordance with an aspect of the present application.

FIG. 7 illustrates a network device 700 which facilitates avoiding duplicate IPFIX flow records, in accordance with an aspect of the present application. Network device 700 includes a processor 702, a memory 704, and a storage device 706. Memory 704 may include a volatile memory (e.g., random access memory (RAM)) that serves as a managed memory and can be used to store one or more memory pools. Furthermore, network device 700 may be coupled to peripheral I/O user devices 710 (e.g., a display device 711, a keyboard 712, and a pointing device 713). Storage device 706 includes non-transitory computer-readable storage medium and stores an operating system 716, instructions 718, and data 736. Network device 700 may be a computer system and may include fewer or more entities or instructions than those shown in FIG. 7.

Instructions 718 can include instructions, which when executed by network device 700, can cause network device 800 to perform methods and/or processes described in this disclosure. Specifically, instructions 718 may include instructions 720 to receive a first flow indicating a destination internal to the network fabric, as described above in relation to operation 302 of FIG. 3 and operation 602 of FIG. 6.

Instructions 718 may include instructions 722 to record the first flow and a corresponding first reverse flow in a flow table, as described above in relation to operation 304 of FIG. 3 and operation 604 of FIG. 6.

Instructions 718 may include instructions 724 to mark the network device as an owner for the first flow and the first reverse flow, wherein a respective owner is to provide information associated with a respective flow based on Internet Protocol Flow Information Export (IPFIX), as described above in relation to operation 306 of FIG. 3 and operation 606 of FIG. 6.

Instructions 718 may include instructions 726 to export information associated with the first flow and the first reverse flow, as described above in relation to IPFIX record 264 of FIG. 2A, operation 308 of FIG. 3, and operation 608 of FIG. 6.

Instructions 718 may include instructions 728 to receive a second flow, a source of which, as indicated by the flow table or a packet of the second flow, has previously been marked as an owner for the second flow and for a corresponding second reverse flow, as described above in relation to operation 310 of FIG. 3.

Instructions 718 may include instructions 730 to record the second flow and the second reverse flow in the flow table, as described above in relation to operation 312 of FIG. 3 and operation 618 of FIG. 6.

Instructions 718 may include instructions 732 to refrain from marking the network device as the owner for the second flow and the second reverse flow, as described above in relation to operation 314 of FIG. 3 and operation 618 of FIG. 6.

Instructions 718 may include instructions 734 to refrain from exporting information associated with the second flow and the second reverse flow, as described above in relation to operation 316 of FIG. 3 and operation 618 of FIG. 6.

Instructions 718 may include more instructions than those shown in FIG. 7. For example, instructions 718 may include instructions for executing the operations described above in relation to: the environments of FIGS. 2A and 4; the header of FIG. 2B; the operations depicted in the flowcharts of FIGS. 3 and 6; and the instructions of CRM 800 in FIG. 8.

Data 736 can include any data that is required as input or that is generated as output by the methods, operations, communications, and/or processes described in this disclosure. Specifically, data 736 can store at least: information associated with a packet or a flow; an indicator that an access switch is an owner of a flow; exported information associated with a flow; a flow table; an indicator of an overlay network; a value in a fabric header; flag fields in a header; an indicator of whether a flow is received on an uplink or a downlink port; an indicator of whether a flow is associated with a same or a different subnet than an access switch; an identifier of a switch or other network device; a 5-tuple of information; an IP address of a source or a destination of a flow; an indicator of a port associated with a source or a destination of a flow; and an IP protocol.

Figure 8:
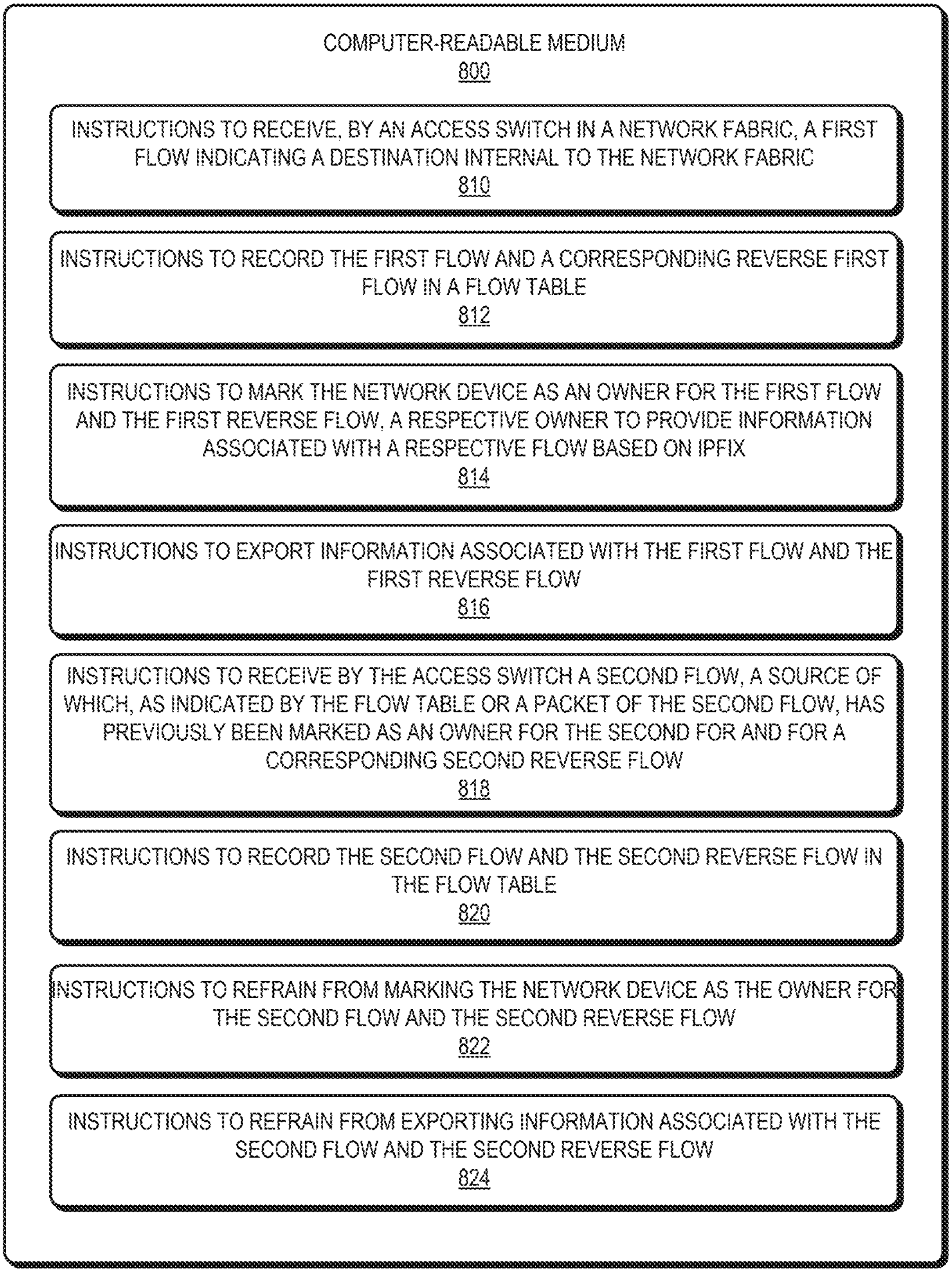
FIG. 8 illustrates a computer-readable medium which facilitates avoiding duplicate IPFIX flow records, in accordance with an aspect of the present application.

FIG. 8 illustrates a computer-readable medium 800 which facilitates avoiding duplicate IPFIX flow records, in accordance with an aspect of the present application. CRM 800 can be a non-transitory computer-readable medium or device storing instructions that when executed by a computer or processor cause the computer or processor to perform a method. CRM 800 may store instructions 810 to receive, by an access switch in a network fabric, a first flow indicating a destination internal to the network fabric, as described above in relation to operation 302 of FIG. 3 and operation 602 of FIG. 6.

CRM 800 may store instructions 812 to record the first flow and a corresponding first reverse flow in a flow table, as described above in relation to operation 304 of FIG. 3 and operation 604 of FIG. 6.

CRM 800 may store instructions 814 to mark the access switch as an owner for the first flow and for the first reverse flow, a respective owner to provide information associated with a respective flow based on Internet Protocol Flow Information Export (IPFIX), as described above in relation to operation 306 of FIG. 3 and operation 606 of FIG. 6.

CRM 800 may store instructions 816 to export information associated with the first flow and the first reverse flow, as described above in relation to IPFIX record 264 of FIG. 2A, operation 308 of FIG. 3, and operation 608 of FIG. 6.

CRM 800 may store instructions 818 to receive by the access switch a second flow, a source of which, as indicated by the flow table or a packet of the second flow, has previously been marked as an owner for the second flow and for a corresponding second reverse flow, as described above in relation to operation 310 of FIG. 3.

CRM 800 may store instructions 820 to record the second flow and the second reverse flow in the flow table, as described above in relation to operation 312 of FIG. 3 and operation 618 of FIG. 6.

CRM 800 may store instructions 822 to refrain from marking the access switch as the owner for the second flow and the second reverse flow, as described above in relation to operation 314 of FIG. 3 and operation 618 of FIG. 6.

CRM 800 may store instructions 824 to refrain from exporting information associated with the second flow and the second reverse flow, as described above in relation to operation 316 of FIG. 3 and operation 618 of FIG. 6.

CRM 800 may include more instructions than those shown in FIG. 8. For example, CRM 800 may also store instructions for executing the operations described above in relation to: the environments of FIGS. 2A and 4; the header of FIG. 2B; the operations depicted in the flowcharts of FIGS. 3 and 6; and instructions 718 of computer system 700 in FIG. 7.

The term "network device" refers to any device, component, or computing entity which can provide a communication pipeline for packets sent from a "processing node" or an "endpoint node." A processing or endpoint node can refer to a device, component, or hardware component which can operate as a source or a destination of data, including e.g., a control packet or a data packet. An example of a network device may be a switch, and an example of a processing or endpoint node may be a downstream client 118/218/418 or 128/228/428, as described above in relation to, respectively, FIGS. 1A, 2A, and 4.

The term "network fabric" refers to a network which communicates based on a same protocol, including a structure or mesh of interconnected networking hardware components, e.g., switches, routers, and cables. An example of a network fabric can be an overlay network (e.g., EVPN/VxLAN-based network fabrics) or a non-overlay network (e.g., in which network devices do not share a same corporate subnet or the same IP prefixes). A network fabric may include an enterprise network or a site for an organization or corporation.

In general, the disclosed aspects provide a method, a network device, and a computer-readable medium which facilitate avoiding duplicate IPFIX flow records. During operation, the system receives, by an access switch in a network fabric, a first flow indicating a destination internal to the network fabric. The system records the first flow and a corresponding first reverse flow in a flow table. The system marks the access switch as an owner for the first flow and for the first reverse flow, a respective owner to provide information associated with a respective flow based on Internet Protocol Flow Information Export (IPFIX). The system exports information associated with the first flow and the first reverse flow. The system receives a second flow, a source of which, as indicated by the flow table or a packet of the second flow, has previously been marked as an owner for the second flow and for a corresponding second reverse flow. The system records the second flow and the second reverse flow in the flow table. The system refrains from marking the access switch as the owner for the second flow and the second reverse flow and refrains from exporting information associated with the second flow and the second reverse flow.

In a variation on this aspect, the network fabric comprises an Ethernet Virtual Private Network (EVPN) overlay network. The access switch comprises a Virtual Tunnel Endpoint (VTEP). Marking the access switch as the owner for the first flow comprises setting a first value in a fabric header of a packet of the first flow. Refraining from marking the access switch as the owner for the second flow and the second reverse flow comprises resetting a second value in a fabric header of a packet of the second reverse flow.

In a further variation on this aspect, the system receives the second reverse flow. The system determines that the flow table indicates that the destination of the second reverse flow has been previously marked as the owner for the second flow and the second reverse flow. The system resets the second value in the fabric header of the packet of the second reverse flow.

In a further variation on this aspect, the system determines that the second flow indicates that the source of the second flow has been previously marked as the owner for the second flow and the second reverse flow, which comprises: determining that the second flow is received on an uplink port of the access switch; and determining that the source of the second flow is associated with a same subnet as the access switch.

In a further variation, the system marks the access switch as the owner of the first flow and the first reverse flow in response to at least one of: determining that the first flow is received on a downlink port of the access switch and that a destination of the first flow is associated with a same subnet as the access switch; determining that the first flow is received on a downlink port of the access switch and that a destination of the first flow is associated with a different subnet than the access switch; or determining that the first flow is received on an uplink port of the access switch and that a source of the first flow is associated with a different subnet than the access switch.

In a further variation, the system tracks a first count associated with packets of the first flow and the first reverse flow by setting a first corresponding indicator in the flow table. The system exports the information associated with the first flow and the first reverse flow based on the tracked first count and the first corresponding indicator.

In a further variation, the system refrains from tracking a second count associated with packets of the second flow and the second reverse flow by resetting a second corresponding indicator in the flow table. The system refrains from exporting the information associated with the second flow and the second reverse flow based on the second corresponding indicator.

In a further variation, a respective flow indicates at least one of: an Internet Protocol (IP) address of a source of the respective flow; a port associated with the source of the respective flow; an IP address of a destination of the respective flow; a port associated with the destination of the respective flow; or a protocol based on IP associated with respective flow.

In a further variation, the system determines whether a source or a destination of a respective flow is associated with a same subnet as the access switch or a different subnet than the access switch based on information received by the access switch from a network management station. The system determines whether a port is an uplink port or a downlink port of the access switch based on whether Link Layer Discovery Protocol (LLDP) information is received from neighbors of the access switch.

In another aspect, a network device (or computer system) comprises a processor and a storage device storing instructions. The instructions are to receive a first flow indicating a destination internal to the network fabric. The instructions are further to record the first flow and a corresponding first reverse flow in a flow table and mark the network device as an owner for the first flow and the first reverse flow, wherein a respective owner is to provide information associated with a respective flow based on Internet Protocol Flow Information Export (IPFIX). The instructions are further to export information associated with the first flow and the first reverse flow. The instructions are further to receive a second flow, a source of which, as indicated by the flow table or a packet of the second flow, has previously been marked as an owner for the second flow and for a corresponding second reverse flow. The instructions are further to record the second flow and the second reverse flow in the flow table. The instructions are further to refrain from marking the network device as the owner for the second flow and the second reverse flow refrain from exporting information associated with the second flow and the second reverse flow. The CRM can also store instructions for executing the operations described above in relation to: the environments of FIGS. 2A and 4A; the header of FIG. 2B; the operations depicted in the flowcharts of FIGS. 3 and 6; and the instructions of CRM 800 in FIG. 8.

In another aspect, a non-transitory computer-readable storage medium (or CRM) stores instructions to receive, by an access switch in a network fabric, a first flow indicating a destination internal to the network fabric. The instructions are further to record the first flow and a corresponding first reverse flow in a flow table. The instructions are further to mark the access switch as an owner for the first flow and for the first reverse flow, a respective owner to provide information associated with a respective flow based on Internet Protocol Flow Information Export (IPFIX). The instructions are further to export information associated with the first flow and the first reverse flow. The instructions are further to receive by the access switch a second flow, a source of which, as indicated by the flow table or a packet of the second flow, has previously been marked as an owner for the second flow and for a corresponding second reverse flow. The instructions are further to record the second flow and the second reverse flow in the flow table. The instructions are further to refrain from marking the access switch as the owner for the second flow and the second reverse flow and refrain from exporting information associated with the second flow and the second reverse flow. The CRM can also store instructions for executing the operations described above in relation to: the environments of FIGS. 2A and 4A; the header of FIG. 2B; the operations depicted in the flowcharts of FIGS. 3 and 6; and instructions 718 of computer system 700 in FIG. 7.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method, comprising:

receiving, by an access switch in a network fabric, a first flow indicating a destination internal to the network fabric;

recording the first flow and a corresponding first reverse flow in a flow table;

marking the access switch as an owner for the first flow and for the first reverse flow, a respective owner to provide information associated with a respective flow based on Internet Protocol Flow Information Export (IPFIX);

exporting information associated with the first flow and the first reverse flow;

receiving a second flow, a source of which, as indicated by the flow table or a packet of the second flow, has previously been marked as an owner for the second flow and for a corresponding second reverse flow;

recording the second flow and the second reverse flow in the flow table;

refraining from marking the access switch as the owner for the second flow and the second reverse flow; and refraining from exporting information associated with the second flow and the second reverse flow.

2. The method of claim 1, wherein the network fabric comprises an Ethernet Virtual Private Network (EVPN) overlay network, wherein the access switch comprises a Virtual Tunnel Endpoint (VTEP), wherein marking the access switch as the owner for the first flow comprises setting a first value in a fabric header of a packet of the first flow, and wherein refraining from marking the access switch as the owner for the second flow and the second reverse flow comprises resetting a second value in a fabric header of a packet of the second reverse flow.

3. The method of claim 2, receiving the second reverse flow;

determining that the flow table indicates that the destination of the second reverse flow has been previously marked as the owner for the second flow and the second reverse flow; and resetting the second value in the fabric header of the packet of the second reverse flow.

4. The method of claim 1, further comprising:

determining that the second flow indicates that the source of the second flow has been previously marked as the owner for the second flow and the second reverse flow, which comprises:

determining that the second flow is received on an uplink port of the access switch; and determining that the source of the second flow is associated with a same subnet as the access switch.

5. The method of claim 1, further comprising:

marking the access switch as the owner of the first flow and the first reverse flow in response to at least one of:

determining that the first flow is received on a downlink port of the access switch and that a destination of the first flow is associated with a same subnet as the access switch;

determining that the first flow is received on a downlink port of the access switch and that a destination of the first flow is associated with a different subnet than the access switch; or determining that the first flow is received on an uplink port of the access switch and that a source of the first flow is associated with a different subnet than the access switch.

6. The method of claim 1, further comprising:

tracking a first count associated with packets of the first flow and the first reverse flow by setting a first corresponding indicator in the flow table; and exporting the information associated with the first flow and the first reverse flow based on the tracked first count and the first corresponding indicator.

7. The method of claim 1, further comprising:

refraining from tracking a second count associated with packets of the second flow and the second reverse flow by resetting a second corresponding indicator in the flow table; and refraining from exporting the information associated with the second flow and the second reverse flow based on the second corresponding indicator.

8. The method of claim 1, wherein a respective flow indicates at least one of:

an Internet Protocol (IP) address of a source of the respective flow;

a port associated with the source of the respective flow;

an IP address of a destination of the respective flow;

a port associated with the destination of the respective flow; or a protocol based on IP associated with respective flow.

9. The method of claim 1, further comprising:

determining whether a source or a destination of a respective flow is associated with a same subnet as the access switch or a different subnet than the access switch based on information received by the access switch from a network management station; and determining whether a port is an uplink port or a downlink port of the access switch based on whether Link Layer Discovery Protocol (LLDP) information is received from neighbors of the access switch.

10. A network device in a network fabric, the network device comprising:

at least one processing resource; and a storage device storing instructions which when executed by the at least one processing resource comprise instructions to:

receive a first flow indicating a destination internal to the network fabric;

record the first flow and a corresponding first reverse flow in a flow table;

mark the network device as an owner for the first flow and the first reverse flow, wherein a respective owner is to provide information associated with a respective flow based on Internet Protocol Flow Information Export (IPFIX);

export information associated with the first flow and the first reverse flow;

receive a second flow, a source of which, as indicated by the flow table or a packet of the second flow, has previously been marked as an owner for the second flow and for a corresponding second reverse flow;

record the second flow and the second reverse flow in the flow table;

refrain from marking the network device as the owner for the second flow and the second reverse flow; and refrain from exporting information associated with the second flow and the second reverse flow.

11. The network device of claim 10, wherein the network fabric comprises an Ethernet Virtual Private Network (EVPN) overlay network, wherein the network device comprises a Virtual Tunnel Endpoint (VTEP), wherein the instructions to mark the network device as the owner for the first flow further comprise setting a first value in a fabric header of a packet of the first flow, and wherein the instructions to refrain from marking the access network device switch as the owner for the second flow and the second reverse flow further comprise resetting a second value in a fabric header of a packet of the second reverse flow.

12. The network device of claim 11, the instructions further to:

receive the second reverse flow;

determine that the flow table indicates that the destination of the second reverse flow has been previously marked as the owner for the second flow and the second reverse flow; and reset the second value in the fabric header of the packet of the second reverse flow.

13. The network device of claim 10, the instructions further to:

determine that the second flow indicates that the source of the second flow has been previously marked as the owner for the second flow and the second reverse flow, which comprises:

determining that the second flow is received on an uplink port of the network device; and determining that the source of the second flow is associated with a same subnet as the network device.

14. The network device of claim 10, the instructions further to:

mark the network device as the owner of the first flow and the first reverse flow in response to at least one of:

determining that the first flow is received on a downlink port of the network device and that a destination of the first flow is associated with a same subnet as the network device;

determining that the first flow is received on a downlink port of the network device and that a destination of the first flow is associated with a different subnet than the network device; or determining that the first flow is received on an uplink port of the network device and that a source of the first flow is associated with a same subnet as the network device.

15. The network device of claim 10, the instructions further to:

track a first count associated with packets of the first flow and the first reverse flow by setting a first corresponding indicator in the flow table; and export the information associated with the first flow and the first reverse flow based on the tracked first count and the first corresponding indicator.

16. The network device of claim 10, the instructions further to:

refrain from tracking a second count associated with packets of the second flow and the second reverse flow by resetting a second corresponding indicator in the flow table; and refrain from exporting the information associated with the second flow and the second reverse flow based on the second corresponding indicator.

17. The network device of claim 10, wherein a respective flow indicates at least one of:

an Internet Protocol (IP) address of a source of the respective flow;

a port associated with the source of the respective flow;

an IP address of a destination of the respective flow;

a port associated with the destination of the respective flow; or a protocol based on IP associated with respective flow.

18. A non-transitory computer-readable medium storing instructions which when executed by a processing resource comprise instructions to:

receive, by an access switch in a network fabric, a first flow indicating a destination internal to the network fabric;

record the first flow and a corresponding first reverse flow in a flow table;

mark the access switch as an owner for the first flow and for the first reverse flow, a respective owner to provide information associated with a respective flow based on Internet Protocol Flow Information Export (IPFIX);

export information associated with the first flow and the first reverse flow;

receive by the access switch a second flow, a source of which, as indicated by the flow table or a packet of the second flow, has previously been marked as an owner for the second flow and for a corresponding second reverse flow;

record the second flow and the second reverse flow in the flow table;

refrain from marking the access switch as the owner for the second flow and the second reverse flow; and refrain from exporting information associated with the second flow and the second reverse flow.

19. The non-transitory computer-readable medium of claim 18, wherein the network fabric comprises an Ethernet Virtual Private Network (EVPN) overlay network, wherein the access switch comprises a Virtual Tunnel Endpoint (VTEP), wherein the instructions to mark the access switch as the owner for the first flow further comprise setting a first value in a fabric header of a packet of the first flow, and wherein the instructions to refrain from marking the access switch as the owner for the second flow and the second reverse flow further comprise resetting a second value in a fabric header of a packet of the second reverse flow.

20. The non-transitory computer-readable medium of claim 18, the instructions further to:

determine that the second flow indicates that the source of the second flow has been previously marked as the owner for the second flow and the second reverse flow, by:

determining that the second flow is received on an uplink port of the access switch; and determining that the source of the second flow is associated with a same subnet as the access switch.

* * * * *